United States Patent
Yoon

(10) Patent No.: US 7,336,329 B2
(45) Date of Patent: Feb. 26, 2008

(54) LIQUID CRYSTAL DISPLAY DEVICE USING HOLOGRAPHIC DIFFUSER

(75) Inventor: Sunghoe Yoon, Annyang-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/288,445

(22) Filed: Nov. 6, 2002

(65) Prior Publication Data
US 2003/0086034 A1 May 8, 2003

(30) Foreign Application Priority Data
Nov. 8, 2001 (KR) ............................... 2001-69444

(51) Int. Cl.
*G02F 1/1335* (2006.01)
(52) U.S. Cl. .................. 349/112; 359/15; 359/599
(58) Field of Classification Search ............. 349/112, 349/64; 359/599
See application file for complete search history.

(56) References Cited

U.S. PATENT DOCUMENTS

| | | | |
|---|---|---|---|
| 5,600,456 A * | 2/1997 | Maruyama et al. | 349/64 |
| 5,629,784 A * | 5/1997 | Abileah et al. | 349/112 |
| 5,659,376 A * | 8/1997 | Uehara et al. | 349/58 |
| 5,709,463 A * | 1/1998 | Igram | 362/268 |
| 5,936,751 A * | 8/1999 | Wenyon | 359/15 |
| 6,044,196 A * | 3/2000 | Winston et al. | 385/146 |
| 6,068,381 A * | 5/2000 | Ayres | 362/31 |
| 6,204,902 B1 * | 3/2001 | Kim et al. | 349/112 |
| 6,421,148 B2 * | 7/2002 | Steiner | 359/15 |
| 6,426,763 B1 * | 7/2002 | Sagawa | 346/65 |
| 6,590,621 B1 * | 7/2003 | Creek et al. | 349/5 |
| 7,009,771 B2 * | 3/2006 | Bourdelais et al. | 359/599 |

FOREIGN PATENT DOCUMENTS

| | | |
|---|---|---|
| JP | 03-294802 | 12/1991 |
| JP | 08-114770 | 5/1996 |
| JP | 08-254641 | 10/1996 |
| JP | 09-152602 | 6/1997 |
| JP | 10-068946 | 3/1998 |

OTHER PUBLICATIONS

Office Action issued by the Chinese Patent Office on May 19, 2006.

* cited by examiner

*Primary Examiner*—David Nelms
*Assistant Examiner*—David Chung
(74) *Attorney, Agent, or Firm*—McKenna, Long & Aldridge, LLP

(57) ABSTRACT

A liquid crystal display device includes a liquid crystal cell, a first polarizer under the liquid crystal cell, a backlight under the first polarizer, and a holographic diffuser over the liquid crystal cell. The holographic diffuser includes a spacer and a diffusing layer over the spacer. The spacer includes an open portion and a lower surface of the diffusing layer includes a holographic pattern.

26 Claims, 2 Drawing Sheets

LIQUID CRYSTAL DISPLAY DEVICE USING HOLOGRAPHIC DIFFUSER

This application claims the benefit of Korean Patent Application No. 2001-69444, filed on Nov. 8, 2001, which is hereby incorporated by reference for all purposes as if fully set forth herein.

BACKGROUND OF THE INVENTION

1. Field of the Invention

The present invention relates to liquid crystal display (LCD) devices, and more particularly to an LCD device including a diffuser.

2. Discussion of the Related Art

Owing to their small size, light weight, and low power consumption, flat panel display (FPD) devices have been the subject of much research in the field of information technology. Among the many types of FPD devices, LCD devices have excellent color, resolution, and display characteristics and are used in devices such as notebook personal computers (PCs), desktop PCs, etc. Generally, LCD devices include first and second electrode bearing substrates coupled to, and spaced apart from each other by a layer of liquid crystal material. LCD devices exploit anisotropic optical properties of the liquid crystal material and display images. In particular, electric fields generated when a voltage is applied to the electrodes on the substrates can selectively manipulate the light transmittance characteristics of the liquid crystal material.

FIG. 1 illustrates a cross-sectional view of a liquid crystal cell in a related art transmissive-type LCD device.

Referring to FIG. 1, liquid crystal cells generally include first and second transparent substrates 10 and 20, respectively, that are coupled to, and spaced apart from each other by a layer of liquid crystal material 30. A thin film transistor (TFT) "T" is arranged on an inner surface of the first substrate 10 and includes a gate electrode 11, a gate insulating layer 12, an active layer 13, an ohmic contact layer 14, a source electrode 15a, and a drain electrode 15b. A passivation layer 16 covers the TFT and includes a contact hole 16c exposing the drain electrode 15b. A pixel electrode 17 made of transparent conductive material is formed on the passivation layer 16 and contacts the drain electrode 15b through the contact hole 16c.

A black matrix 21 is arranged on an inner surface of the second substrate 20 at a position corresponding to the location of the TFT on the first substrate 10. Individual color filters 22a and 22b are provided on the black matrix 21 and include one of red (R), green (G), and blue (B) filters. Each color filter is arranged in a location corresponding with the location of a respective pixel electrode 17 on the first substrate 10. A common electrode 23 made of transparent conductive material is formed on the color filters 22a and 22b.

A layer of liquid crystal material 30 is provided between the pixel and common electrodes 17 and 23, respectively. When a voltage is applied to the pixel and common electrodes 17 and 23, respectively, molecules within the liquid crystal material 30 become realigned and the light transmittance characteristics of the light crystal material 30 may be altered. Although not shown, orientation films are formed on the pixel and common electrodes to align the liquid crystal molecules within the liquid crystal cell.

Liquid crystal cells, by themselves, do not emit light. Therefore, images created by transmissive-type LCD devices are typically displayed using external light sources (e.g., backlights arranged under the first polarizer 41). The light generated by the external light sources is selectively transmitted by the liquid crystal cell.

First and second polarizers 41 and 42, respectively, are arranged on exterior surfaces of the first and second substrates 10 and 20, respectively, such that their respective transmission axes are oriented perpendicular to each other. The polarizers convert unpolarized light emitted by the external light source into linearly polarized light. Due to the presence of the first and second polarizers, only light having a polarization direction parallel to a transmission axis of each polarizer may be transmitted through the liquid crystal cell.

Provided with a backlight and the polarizers, transmissive LCD devices display images at a high brightness along a primary viewing angle while images are displayed at a low brightness along viewing angles outside the primary viewing angle. To compensate between the differences in brightness along the various viewing angles, diffusers are typically disposed over the liquid crystal cell to scatter transmitted light. Accordingly, diffusers allow LCD devices to display images at a uniform brightness over many viewing angles. In particular, diffusers capable of scattering light by holographic methods provide LCD devices with excellent viewing capabilities.

FIG. 2 illustrates a cross-sectional view of a related LCD device using a holographic diffuser.

Referring to FIG. 2, a first polarizer 50 may be arranged under a liquid crystal cell 40, wherein the liquid crystal cell 40 includes a layer of liquid crystal material 45 provided between two substrates 41 and 42 having electrodes 43 and 44. A backlight 60 is arranged under the first polarizer 50 while a holographic diffuser 70 and a second polarizer 80 are sequentially arranged over the liquid crystal cell 40.

Typical holographic diffusers 70 include an upper diffusing layer 71 and lower overcoat layer 72, both made of organic material. The topography of a lower surface of the diffusing layer 71 includes a holographic pattern. The overcoat layer 72 includes an upper surface that conformally contacts the lower surface of the diffusing layer 71 while a lower surface of the overcoat layer 72 presents a substantially planar surface to the liquid crystal panel 40. The diffusing layer 71 and the overcoat layer 72 have different refractive indices and scatter light transmitted to the second polarizer 80.

As the difference in the refractive index between the diffusing layer 71 and the overcoat layer 72 increases, the diffusion angle of the holographic diffuser and the viewing angle of the LCD device increases. Generally, differences in refractive index of over about 0.3 are achieved by providing the diffusing layer 71 with a refractive index greater than about 1.6 and the overcoat layer 72 with a refractive index less than about 1.3.

Use of the aforementioned holographic diffuser is disadvantageous, however, in that organic materials with low refractive indices have poor adhesive characteristics and forming overcoat layers conformally over the holographic pattern diffusing layers is a complex, time consuming process. Accordingly, LCD devices fabricated with the aforementioned holographic diffuser tend to be expensive and have a low reliability.

SUMMARY OF THE INVENTION

Accordingly, the present invention is directed to a liquid crystal display device that substantially obviates one or more of the problems due to limitations and disadvantages of the related art.

An advantage of the present invention provides a liquid crystal display device having a uniform brightness, high reliability, low cost, and simple manufacturing process.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device may, for example, include a liquid crystal cell, a first polarizer arranged under the liquid crystal cell, a backlight arranged under the first polarizer, and a holographic diffuser arranged over the liquid crystal cell.

In one aspect of the present invention, the holographic diffuser may include a spacer arranged under a diffusing layer.

In another aspect of the present invention, a topography of a lower surface of the diffusing layer may include a holographic pattern.

In yet another aspect of the present invention, the spacer may include an open portion.

In still another aspect of the present invention, a second polarizer may be arranged over the holographic diffuser.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, example of which is illustrated in the accompanying drawings. Wherever possible, similar reference numbers will be used throughout the drawings to refer to the same or like parts.

Figure 3:
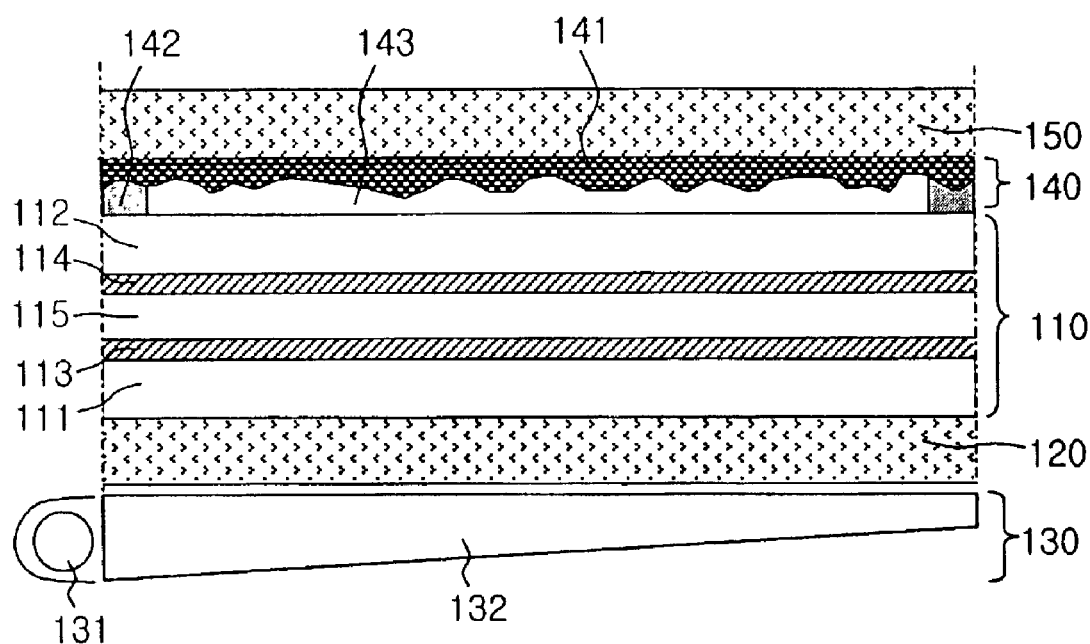
FIG. 3 illustrates a cross-sectional view of an LCD device according to one aspect of the present invention.

FIG. 3 illustrates a cross-sectional view of an LCD device according to one aspect of the present invention.

Referring to FIG. 3, a liquid crystal cell 110 may, for example, include first and second substrates 111 and 112, respectively, that are coupled to, and spaced apart from each other by a layer of liquid crystal material 115. First and second electrodes 113 and 114, respectively, may be formed on interior surfaces of the first and second substrates 111 and 112, respectively. Although not shown, the liquid crystal cell 110 may further include thin film transistors (TFTs), pixel electrodes, and a color filter layer. The TFT and the pixel electrodes may be formed on the first or second substrates 111 or 112 while the color filter layer may be formed on the substrate supporting the pixel electrode or on the substrate not supporting the pixel electrode. In one aspect of the present invention, the color filter layer may provided as an absorbent-type or a cholesteric-liquid-crystal-type color filter.

A first polarizer 120, for transmitting light parallel to its transmission axis, and a backlight 130, for generating unpolarized light, may be sequentially disposed under the liquid crystal cell 110. The backlight 130 may, for example, include a linear light source 131 (e.g., a lamp) for generating the light and a light guide 132 for transmitting the light as a planar light source. In one aspect of the present invention, a collimated pattern may be formed in a surface of the light guide 132 to improve optical properties of the light transmitted through the light guide 132. In another aspect of the present invention, a collimating film may be arranged over the light guiding plate 132 to improve optical properties of the light transmitted through the light guide 132.

According to the principles of the present invention, a holographic diffuser 140 and a second polarizer 150 may be sequentially arranged over the liquid crystal cell 110. The second polarizer 150 may, for example, transmit linearly polarized light. In another aspect of the present invention, a retardation plate having, for example, a retardation value of $\lambda/4$ (e.g., a quarter wave plate), may be arranged between the second polarizer 150 and the holographic diffuser 140. The holographic diffuser 140 may diffuse light transmitted through the liquid crystal cell 110 and allow images to be displayed at a uniform brightness within a wide viewing angle.

In an alternative aspect of the present invention, first and second polarizers 120 and 150 may be arranged within an interior of the liquid crystal cell 110. Accordingly, the first polarizer 120 may be disposed between the first substrate 111 and the first electrode 113 or between the first electrode 113 and the layer of liquid crystal material 115 while the second polarizer 150 may be disposed between the second substrate 112 and the second electrode 114 or between the second electrode 114 and the layer of liquid crystal material 115.

In one aspect of the present invention, the holographic diffuser 140 may, for example, include a spacer 142 and a diffusing layer 141 sequentially arranged over the liquid crystal cell 110. The spacer 142 may include an open portion and the topography of the lower surface of the diffusing layer 141 may include a holographic pattern. The spacer 142 may contact a periphery of the diffusing layer 141 and air may be provided within the open portion 143. The spacer 142 may be attached to both the diffusing layer 141 and the liquid crystal cell 110 via adhesive material (not shown) or other well known means.

In one aspect of the present invention, excluding the thickness of the holographic pattern, the diffusing layer 141 may have a thickness within a range of several tens to several hundreds micrometers. In another aspect of the present invention, the diffusing layer 141 may be formed on a substrate that has undergone a surface treatment imparting a predetermined resistance to scratching, tearing, or other distortion caused by externally applied forces.

Figure 4:
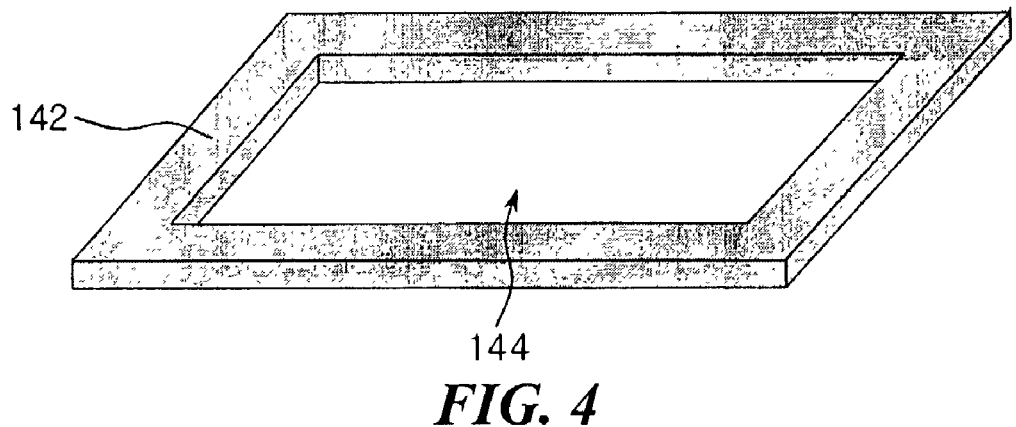
FIG. 4 illustrates a perspective view of a holographic diffuser according to one aspect of the present invention.

FIG. 4 illustrates a perspective view of a holographic diffuser according to one aspect of the present invention.

Referring to FIG. 4, the holographic diffuser 140 may, for example, include a diffusing layer 141 arranged over a spacer 142. As mentioned above, the topography of the lower surface of the diffusing layer 141 may include a holographic pattern and the spacer 142 may include an open portion 144. In one aspect of the present invention, the thickness of the spacer 142 may be greater than the thickness of the holographic pattern. The spacer 142 may, for example, be formed from a material such as a polyester and have a thickness between about 0.3 μm and about 100 μm. In another aspect of the present invention, when the spacer 142 contacts the liquid crystal cell 110, air 144 may be provided within a space between the diffusing layer 141, the spacer 142, and the liquid crystal cell 110.

Figure 1:
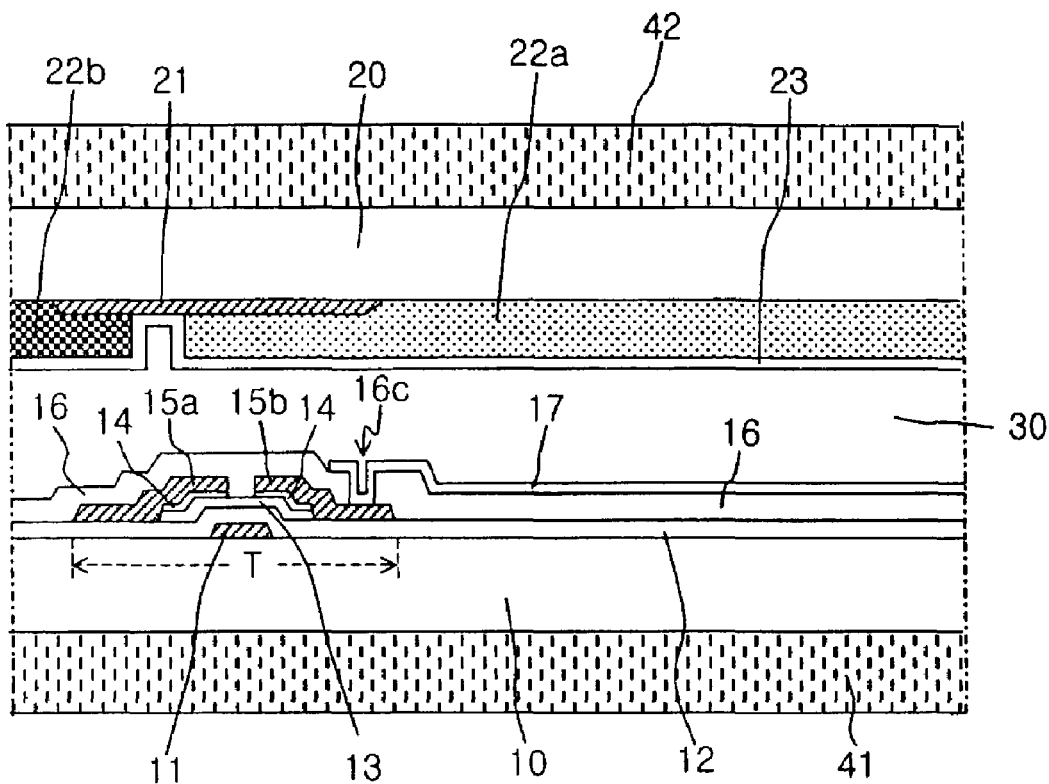
FIG. 1 illustrates a cross-sectional view of a related art transmissive-type LCD device.
Figure 2:
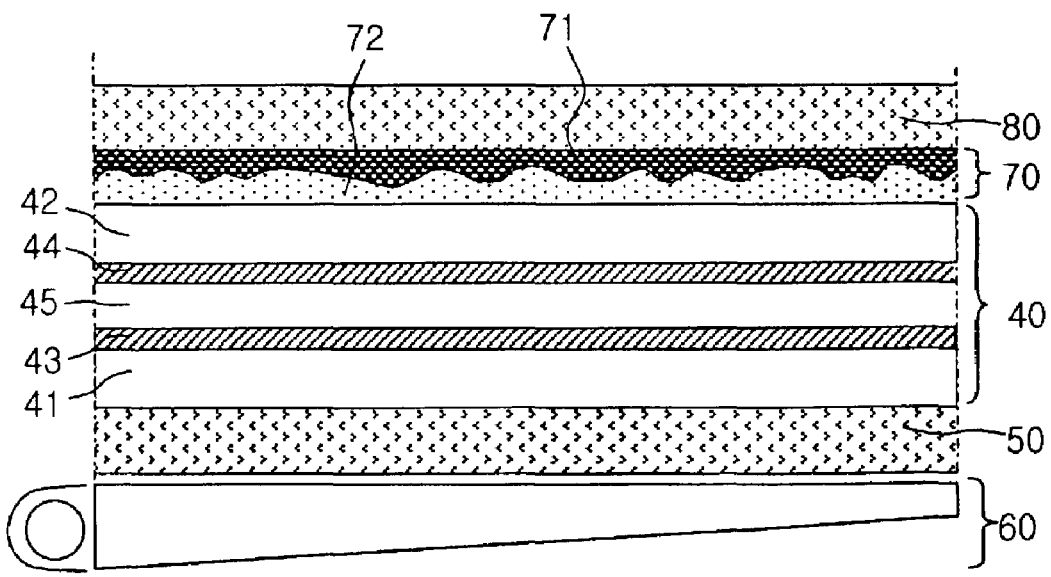
FIG. 2 illustrates a cross-sectional view of a related art LCD device including a holographic diffuser.

According to the principles of the present invention, the diffusing layer 141 may, for example, be formed of an organic material (e.g., an organic resin) having a refractive index between about 1.1 and about 1.9 (e.g., about 1.5). As air typically has a refractive index of about 1.0, the difference in refractive indices between the diffusing layer and the air within the opening may be greater than about 0.5. Accordingly, a diffusion angle of the holographic diffuser, and thus the viewing angle of the LCD device, may be increased over holographic diffusers such as those illustrated in FIG. 2.

In one aspect of the present invention, the diffusing layer 141 may be fabricated by coating a light or heat curable resin on a substrate and pressing the resin using, for example, a stamping device having a holographic pattern. After being pressed, the resin may be cured and the diffusing layer may thus be formed. In one aspect of the present invention, the stamping device may be removed from the resin before or after the curing is initiated or completed. In one aspect of the present invention, the second polarizer 150 may be provided as the substrate on which the diffusing layer 141 is formed. In another aspect of the present invention, if the LCD device includes the retardation plate, the retardation plate may be used as the substrate on which the diffusing layer 141 is formed.

Since a spacer having an open portion may be arranged between a liquid crystal cell and a diffusing layer including a holographic pattern, a fabricating process of an LCD device using a holographic diffuser may be simplified. Accordingly, the fabrication cost may be reduced while increasing the reliability of the LCD device. Moreover, since the holographic diffuser is composed of the diffusing layer and air, a difference in refractive indices may be maximized.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal cell;
   a first polarizer;
   a second polarizer;
   a backlight under the first polarizer; and
   a holographic diffuser over the liquid crystal cell, the holographic diffuser including a spacer and a diffusing layer over the spacer, wherein the spacer includes an open portion and a topography of a lower surface of the diffusing layer includes a holographic pattern.

2. The device according to claim 1, wherein the first polarizer is under the liquid crystal cell.

3. The device according to claim 1, wherein the second polarizer is over the holographic diffuser.

4. The device according to claim 1, wherein the liquid crystal cell further comprises:
   a first substrate having a first surface; and
   a second substrate having a second surface, facing the first surface.

5. The device according to claim 4, wherein the liquid crystal cell further comprises:
   a first plurality of electrodes formed on the first surface; and
   a second plurality of electrodes formed on the second surface.

6. The device according to claim 5, wherein the liquid crystal cell further comprises liquid crystal material between the first and second plurality of electrodes.

7. The device according to claim 5, wherein the first polarizer is between the first substrate and the first plurality of electrodes.

8. The device according to claim 5, wherein the second polarizer is between the second substrate and the second plurality of electrodes.

9. The device according to claim 6, wherein the first polarizer is between the first plurality of electrodes and the liquid crystal material.

10. The device according to claim 6, wherein the second polarizer is between the second plurality of electrodes and the liquid crystal material.

11. The device according to claim 1, wherein the spacer contacts a periphery of the diffusing layer.

12. The device according to claim 1, wherein the spacer has a first thickness; and the holographic pattern has a second thickness, less than the first thickness.

13. The device according to claim 1, wherein air is arranged within the open portion.

14. The device according to claim 13, wherein the diffusing layer has a different refractive index from the air.

15. The device according to claim 1, wherein the diffusing layer is formed from an organic resin.

16. The device according to claim 1, wherein the diffusing layer has a refractive index between about 1.1 and about 1.9.

17. The device according to claim 1, wherein the diffusing layer has a refractive index of about 1.5.

18. The device according to claim 1, wherein the spacer is formed from a polyester.

19. The device according to claim 1, wherein the spacer has a thickness between about 0.3 μm and about 100 μm.

20. The device according to claim 1, wherein the diffusing layer is formed on the second polarizer.

21. The device according to claim 1, further comprising a retardation plate between the second polarizer and the holographic diffuser.

22. The device according to claim 21, wherein the diffusing layer is formed on the retardation plate.

23. The device according to claim 1, wherein the spacer is attached to the diffusing layer and the liquid crystal cell via adhesive material.

24. A liquid crystal display device, comprising:
   a liquid crystal cell having first and second surfaces opposite to each other;
   a spacer contacting a periphery of the first surface of the liquid crystal cell;

a diffusing layer over the spacer, wherein the spacer completely separates the diffusing layer from the first surface of the liquid crystal cell; and a backlight unit near the second surface of the liquid crystal cell, wherein the liquid crystal cell is between the backlight unit and the diffusing layer.

25. A liquid crystal display device, comprising:

a backlight unit;

a liquid crystal cell over the backlight unit; and a diffusing layer over the liquid crystal cell, wherein the diffusing layer and the liquid crystal cell are separated from each other by air and a spacer at a periphery of the diffusing layer and wherein the liquid crystal cell is between the backlight unit and the diffusing layer.

26. A display device, comprising:

a display panel with first surface facing a viewer;

a spacer contacting a periphery of the first surface of the display panel; and a diffusing layer having a holographic pattern over the spacer, wherein an air gap is formed between the diffusing layer and the first surface of the display panel due to a height of the spacer and wherein the spacer completely separates the diffusing layer from the first surface of the display panel.

* * * * *